US008944088B2

(12) United States Patent
Gilmer (10) Patent No.: US 8,944,088 B2
(45) Date of Patent: Feb. 3, 2015

(54) SAFETY VALVE

(76) Inventor: Richard T. Gilmer, Crossville, TN (US)

( * ) Notice: Subject to any disclaimer, the term of this patent is extended or adjusted under 35 U.S.C. 154(b) by 316 days.

(21) Appl. No.: 13/528,960

(22) Filed: Jun. 21, 2012

(65) Prior Publication Data

US 2013/0340843 A1    Dec. 26, 2013

(51) Int. Cl.
     *F16K 17/40*      (2006.01)
(52) U.S. Cl.
     USPC ............. 137/76; 137/75; 137/78.4; 137/78.5; 137/68.11; 251/68
(58) Field of Classification Search
     CPC ................................ F16K 17/40; F16K 17/383
     USPC ............. 137/68.11, 68.12, 75, 76, 78.4, 78.5, 137/78.1; 251/66, 68
     See application file for complete search history.

(56) References Cited

U.S. PATENT DOCUMENTS

| | | | | |
|---|---|---|---|---|
| 1,270,389 A | * | 6/1918 | Eitapenc | .................... 137/68.11 |
| 1,402,837 A | | 1/1922 | Christian | |
| 1,494,304 A | * | 5/1924 | Grabowski | ...................... 137/76 |
| 1,570,468 A | * | 1/1926 | Freebury | ....................... 251/268 |
| 1,628,675 A | | 5/1927 | Lovekin | |
| 1,924,356 A | | 8/1933 | Glab | |
| 1,930,624 A | | 10/1933 | Ryan | |
| 1,938,967 A | | 12/1933 | Lovekin | |
| 2,099,992 A | * | 11/1937 | Sutcliffe | ....................... 251/174 |
| 2,301,014 A | * | 11/1942 | Burklin | ........................... 137/75 |
| RE23,272 E | * | 9/1950 | Hobbs | ........................... 251/267 |
| 2,863,469 A | * | 12/1958 | Casey | ............................. 137/72 |
| 3,275,012 A | * | 9/1966 | Howard et al. | ................. 137/76 |
| 3,916,930 A | * | 11/1975 | Erickson | .......................... 137/75 |
| 4,475,389 A | * | 10/1984 | Harris | ......................... 73/304 R |
| 5,497,804 A | * | 3/1996 | Codina et al. | ................. 137/554 |
| 7,821,763 B2 | | 10/2010 | Goodson | |
| 2007/0095400 A1 | | 5/2007 | Bergquist et al. | |
| 2008/0289695 A1 | | 11/2008 | Holzer et al. | |
| 2010/0012871 A1 | | 1/2010 | Farrell | |
| 2010/0263729 A1 | * | 10/2010 | Khonkar | ........................... 137/1 |
| 2011/0024655 A1 | | 2/2011 | Goodson | |
| 2012/0090861 A1 | | 4/2012 | Goodson | |

OTHER PUBLICATIONS

"How the Bottom Line is Changing Residential Gas Systems," by Kenny Hart and Alan Carson, published Jan. 2011 in the ASHI Reporter (American Society of Homes Inspectors), downloaded from the internet May 7, 2012.

* cited by examiner

*Primary Examiner* — John Rivell
*Assistant Examiner* — Christopher Ballman
(74) *Attorney, Agent, or Firm* — Luedeka Neely Group, P.C.

(57) ABSTRACT

A safety valve for interrupting the flow of fuel through a fuel line includes a housing member and a safety valve insert, wherein the housing member houses a portion of the safety valve insert and the valve insert includes a connection end for connecting to a grounding surface to draw electrical current through the safety valve insert, a fusible link, which is broken by electrical current, and a plunger, which is released when the fusible link is broken and interrupts the flow of fuel through a fuel line.

20 Claims, 10 Drawing Sheets

SAFETY VALVE

FIELD

This invention relates to the field of safety valves for the prevention of fires involving fuel leaks. More particularly, this invention relates to a safety valve for preventing fires in corrugated stainless steel and similar tubing and caused by lightning strikes.

BACKGROUND

Historically, steel pipe or black iron pipe was the most common choice for transporting water and flammable gases from one location to another, such as from a supplier to a consumer such as at a home. In the context of flammable gases, black pipe was used in this manner due to its robustness, including a high resistance to heat and high pressure. Straight runs of black pipe may be joined using threaded connection ends. Additionally, various threaded connectors may be used to route the black pipe around obstacles or to change its direction. Alternatively or in addition to threading, the pipe sections and connections may also be joined to the fittings through welding. This provides a very sturdy line through which fuel may flow. However, routing black pipe is often very time consuming and very labor intensive due to the weight of the pipe and the need to weld each of the pieces.

In recent years, an alternative to black pipe has been offered—corrugated stainless steel tubing (CSST). CSST consists of a thin, continuous, flexible stainless steel pipe that may transport and distribute natural gas. In comparison to traditional black pipe, CSST is lighter in weight and requires fewer welded and threaded connections due to its flexibility. However, one significant disadvantage in the use of this form of tubing is its propensity to failure. CSST tends to have narrow sidewall thicknesses (e.g., ~10 millimeters). Narrow walls allow the tubing to remain flexible and easy to maneuver. However, the thin walls also make the tubing prone to puncture or other failure when exposed to rough handling, sharp objects, shock, etc. Once punctured, the tubing may leak fuel, which may be ignited through nearby open flames, sparks, electrical current, self ignition, etc.

This problem is prevalent in the heating and air conditioning industry, which makes extensive use of CSST. In residential applications, CSST is often connected to the fuel source at or near the gas meter and then runs to one or more appliances that rely on gas fuels (e.g., gas heater, gas dryer, gas stove, fireplace, etc.). During a lightning storm or a thunderstorm, the tubing may be energized with electrical energy from lightning strikes at or near the residence. Once energized, electrical arcing may occur between the tubing and nearby objects that are grounded. When this happens, holes may be created in the CSST due the large current associated with electrical strikes. These holes may vary is size from very small, such as a pinhole, to very large, such as 2 or more inches in diameter. In addition to creating these holes, the electrical arcing may also ignite the fuel that escapes from the tubing. As fuel continues to be supplied to the tubing, it continues to burn within the structure and often ignites the structure.

Therefore, what is needed is an automatic fuel shutoff valve for use with a fuel line that responds to the presence of electrical current in the fuel line and interrupts the flow of fuel through the fuel line.

SUMMARY

The above and other needs are met by a safety valve for interrupting the flow of fuel through a fuel line. The safety valve includes an electrically conductive housing, valve means, triggering means and grounding means. The electrically conductive housing may be positioned in a fuel line and is provided with a fluid passage so that fuel may flow from a first section of the fuel line, through the valve and into a second section of the fuel line. The valve means may be used to interrupt fluid passage through the housing member. The triggering means releasably fixes the valve means in an open position whereby fluid passage through the housing member is permitted. Once triggered, the triggering means also causes the valve means to move to a closed position where fluid passage is interrupted. The triggering means may be triggered in response to the presence of electrical current in the valve. The grounding means provides a path through which electrical current may be carried from the triggering means to an electrical ground.

In another embodiment, the valve may include a housing member having a fluid passage therethrough. The housing member includes an inlet orifice and an outlet orifice in fluid communication, and an elongate valve chamber. The inlet orifice is dimensioned for receiving a first fuel line and is designed to permit the flow of fuel into the housing member. The outlet orifice is dimensioned for receiving a second fuel line and is designed to permit the flow of fuel out of the housing member. The elongate valve chamber has a proximal end and a distal end. The distal end is positioned adjacent the inlet orifice and the outlet orifice. The valve chamber further includes an axial bore, and also an annular seat that is located at the proximal end of the valve chamber.

The safety valve also includes a safety valve insert that is positioned within the axial bore of the valve chamber and is used for interrupting the flow of the fuel from the inlet orifice to the outlet orifice. The safety valve insert is movable between an open position and a closed position, and includes a piston assembly that includes a plunger, a stem and a fusible link. The plunger has a first end and a second end. The first end is configured to be received by the annular seat in the closed position to create a seal between the first end and the annular seat to interrupt the flow of fuel from the inlet orifice to the outlet orifice. The stem is connected to the second end of the plunger, and includes an elongate shaft having a lower end and an upper end. The lower end of the stem connects to the plunger. A fusible link connected to the upper end of the stem. The fusible link is located between the upper end of the stem and the distal end of the valve chamber. The fusible link is used for releasably fixing the piston assembly in the open position and for releasing the piston in response to electrical current passing through the link to a grounding surface. A connection end is formed at an end of the fusible link. The connection end extends through the housing member and is connected to a grounding surface. In some embodiments, the fusible link is a replaceable cartridge.

In some embodiments, the safety valve may also include a biasing member that is positioned adjacent the end of the plunger. The biasing member may be used for moving the plunger from the open position to the closed position. In some embodiments, the biasing member may be a coil spring.

In other embodiments, the safety valve may further include an electrically conductive wire that connects the housing member to the safety valve insert. The wire is designed to carry electric current from the housing member to the safety valve insert.

In some embodiments, the safety valve may also include a shell that is positioned adjacent the distal end of the valve chamber. The shell may be dimensioned for encasing at least a portion of the safety valve insert. In certain other embodiments, the shell may be electrically non-conductive. In certain other embodiments, the valve insert may further include a slit that is positioned in a perimeter section of the plunger. In this embodiment the valve chamber further may also include an elongate guide rod that is positioned axially along the perimeter of the axial bore. The guide rod is dimensioned for being slidably moveable within the slit to guide the plunger along the axial bore.

In other embodiments, the valve chamber may a selectively removable cap that is positioned within the axial bore adjacent the distal end of the valve chamber. The cap includes an orifice through which at least a portion of the valve insert may extend out of the valve chamber. Lastly, in some embodiments, the valve chamber includes a threaded connection end for providing a screw-on connection with a similarly threaded shell.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The present invention relates to a safety valve apparatus that may be used to prevent unwanted fires that are caused by the uncontrolled flow of fuel from a section of tubing in the presence of electricity. Strong electrical current, such as produced from lightning strikes, may create fissures or holes in tubing when the current runs through the tubing and then arcs to a nearby surface. Those holes often allow fuel to escape the line, which may be ignited by the electrical current that is running through the tubing. The safety valve of the present invention is designed to prevent that ignition by halting the flow of fuel through the fuel line when electrical current is present. Electric current tends to be drawn to the valve because it is connected to a grounding surface.

Figure 1:
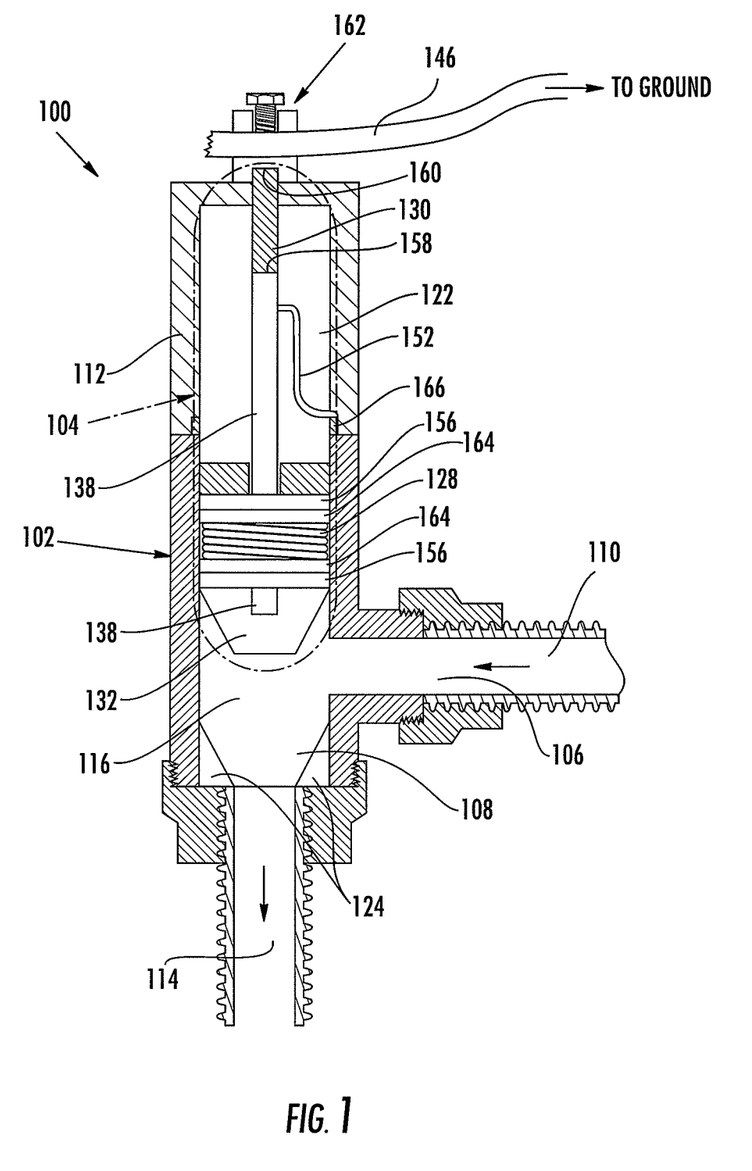
FIG. 1 is a side cross-section view depicting a safety valve according to a first embodiment of the present invention.
Figure 2:
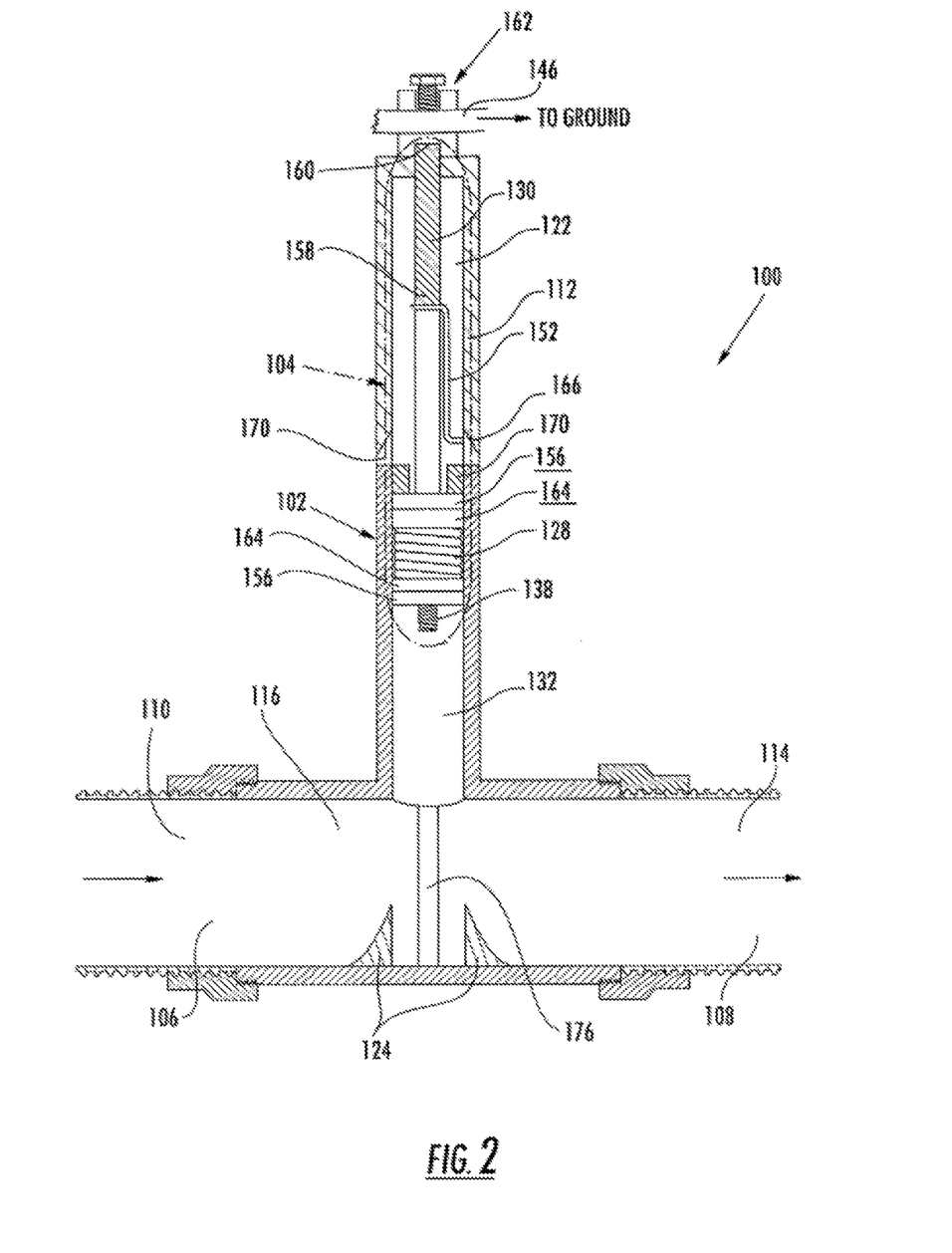
FIG. 2 is a side cross-section view depicting a safety valve according to a second embodiment of the present invention.

As shown in FIGS. 1 and 2, an automatic safety valve 100 is provided. In some embodiments, the automatic safety valve 100 includes a housing member 102 and a safety valve insert 104 that is disposed within the housing member 102. The housing member 102 includes a passage through which fluids may flow. The safety valve insert 104 may be used to interrupt the flow of fluids through the safety valve in the presence of an electric current. In some embodiments, the safety valve insert 104 comprises a replaceable component that may be replaced after the safety valve 100 has been triggered. In other embodiments, only certain portions of the safety valve insert 104 may be replaced after the safety valve 100 has been triggered.

Figure 3:
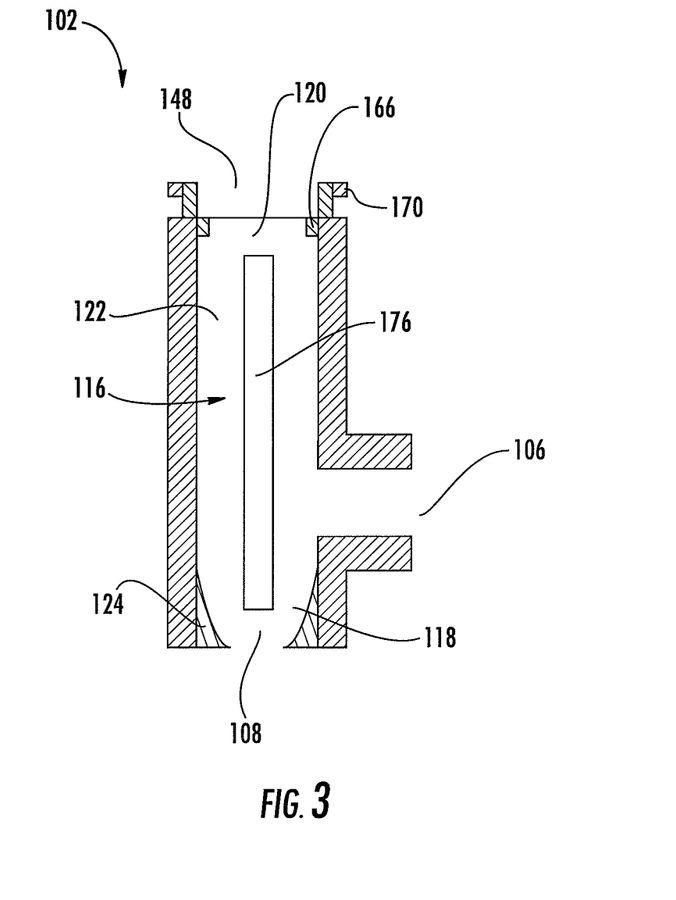
FIG. 3 is a side cross-section view depicting the housing member shown in FIG. 1.

The housing member 102 includes an inlet orifice 106 and an outlet orifice 108 that are in fluid communication with one another. The inlet orifice 106 is dimensioned for receiving a first fuel line 110 through which a fluid may flow into the automatic safety valve 100. Similarly, the outlet orifice 108 is dimensioned for receiving a second fuel line 114 through which the fluid may flow from the safety valve 100 after flowing out of the outlet orifice 108. As shown in FIG. 3, the housing member 102 further includes a valve chamber 116. The valve chamber 116 includes a proximate end 118 and a distal end 120, and is positioned adjacent the inlet orifice 106 and the outlet orifice 108. The valve chamber 116 includes a tubular axial bore 122 that is dimensioned for encasing at least a portion of the safety valve insert 104 (shown in FIGS. 1 and 2). Formed at the proximate end 118 of the valve chamber 116, there may be an annular seat 124 for releasably receiving at least a portion of the safety valve insert 104. Formed at the distal end 120 of the valve chamber 116 there may be a first chamber orifice 148 through which a portion of the valve insert 104 may extend from the valve chamber 116. In certain other embodiments, one or more posts 166 may be formed in the axial bore 122. In particular, the posts 166 may be formed as protrusions that extend radially into the valve chamber 116 from the interior walls of the axial bore 122. The valve first posts 166 may be used as a means of connecting a removable cap 150 (shown in FIG. 4) to the housing member 102. The removable cap 150 may be positioned in the axial bore 122 to cover the first chamber orifice 148 and to close the valve chamber 116. The cap 150 may include a second chamber orifice 172, through which a portion of the valve insert 104 may extend from the valve chamber 116. The cap 150 may be selectively removed to enable a user to access the inside portions of the valve 100, including the valve chamber 116. The connection between the cap 150 and the distal end 120 of the valve chamber 116 may comprise a threaded connection.

Figure 4:
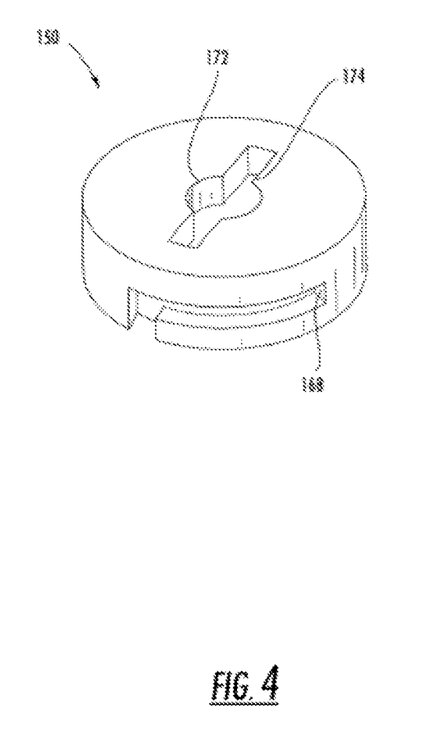
FIG. 4 is a perspective view depicting a cap according to an embodiment of the present invention.

Referring to FIGS. 3 and 4, the cap 150 may comprise one or more valve channels 168 which may receive and engage the valve first posts 166, which are typically disposed in the axial bore 122 of the valve chamber 116. However, in certain other embodiments, the valve channels 168 are disposed in the housing member 102 and the first posts 166 are disposed on the removable cap 150. In certain embodiments, the cap 150 may further include a turn slot 174 to facilitate turning the cap 150 to affix it to the valve chamber 116. In certain embodiments, the turn slot 174 may comprise a flat, square, hexagonal or crossed slot suitable for a flat, square, hexagonal or crossed screwdriver.

Safety valves may be placed into operation where operating conditions are harsh. These conditions may include, for example, high pressure, extreme temperatures, corrosive, flammable or acidic substances. These concerns determine, at least in part, what materials are suitable for use in safety valves. Other concerns may include, for example, contamination, discharge, deposits (e.g., mineral deposits), etc. in the valve, which may cause the valve to malfunction or to fail to function at an optimum level.

Accordingly, the housing member 102 may be constructed from sturdy materials that will withstand these elements. Such materials may include, for example, bronze, iron, brass, steel, stainless steel, etc. As previously mentioned, electricity that is present in the fuel line may be conducted through at least portions of the safety valve 100, including the housing member 102, to ground. Therefore, in some embodiments, the material selected for the housing member 102 may be an electrically conductive material.

Referring again to FIGS. 1 and 2, the valve insert 104 is positioned within the axial bore 122 of the housing member 102. The safety valve insert 104 may be used to interrupt the flow of fuel through the safety valve 100. The valve insert 104 generally includes a piston assembly 126 (FIG. 5), a biasing member 128, and an electrically conductive fusible link 130. An electrically non-conductive shell 112 is positioned adjacent the valve chamber 116 and may be used to house the portions of the safety valve insert 104 that extend from the axial bore 122 of the housing member 102 and the valve chamber 116.

Figure 5:
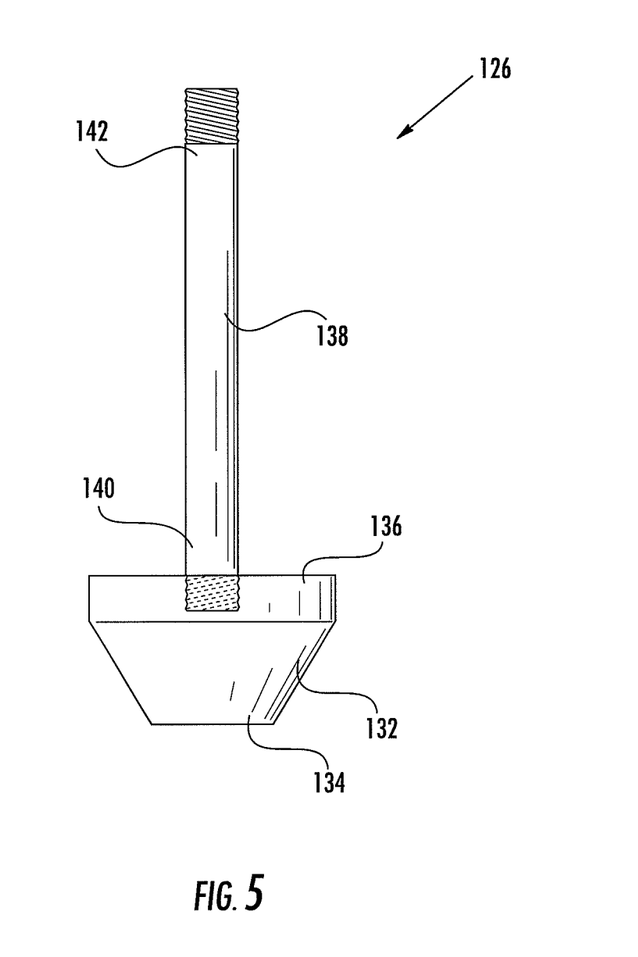
FIG. 5 is a side view depicting a piston assembly according to an embodiment of the present invention.

As shown in FIG. 5, the piston assembly 126 comprises a plunger 132, including a first end 134 and a second end 136, and a stem 138 that comprises a lower end 140 and an upper end 142. In some embodiments, the stem 138 may be connected to the plunger 132 via a threaded or inserted connection. For example, the lower end 140 of the stem 138 may be press fit into the plunger 132, a threaded connected may be used, a welded connection may be used, or the stem 138 and plunger 132 may be formed (e.g., cast) as a unitary piece. Referring now to FIGS. 3 and 5, the piston assembly 126 may be oriented within the axial bore 122 such that the first end 134 of the plunger 132 is positioned nearest the proximate end 118 of the valve chamber 116 and the upper end 142 of the stem 138 is positioned nearest the distal end 120 of the valve chamber 116.

As with the housing member 102, the piston assembly 126, including the plunger 132 and the stem 138, may be subject to very harsh conditions when operating and should, therefore, be constructed from sturdy materials that will withstand these conditions. Such materials may include, for example, bronze, iron, brass, steel, stainless steel, etc. As previously mentioned, electricity that is present in the fuel line may be conducted through at least portions of the safety valve 100. Therefore, the material selected for at least the stem 138 may be an electrically conductive material.

With reference to FIG. 1, after electric current flows from the fuel line 110 and to the housing member 102, it will ideally flow into at least a portion of the valve insert 104, including the valve stem 138 or the plunger 132, and then to the grounding member 146. Since the valve insert 104 is disposed, at least in part, within the valve chamber 116, electricity may arc directly from the housing member 102 to the valve stem 138. As previously mentioned, to facilitate the flow of electricity through the valve 100, the housing 102 is ideally formed using an electrically conductive material.

Figure 10:
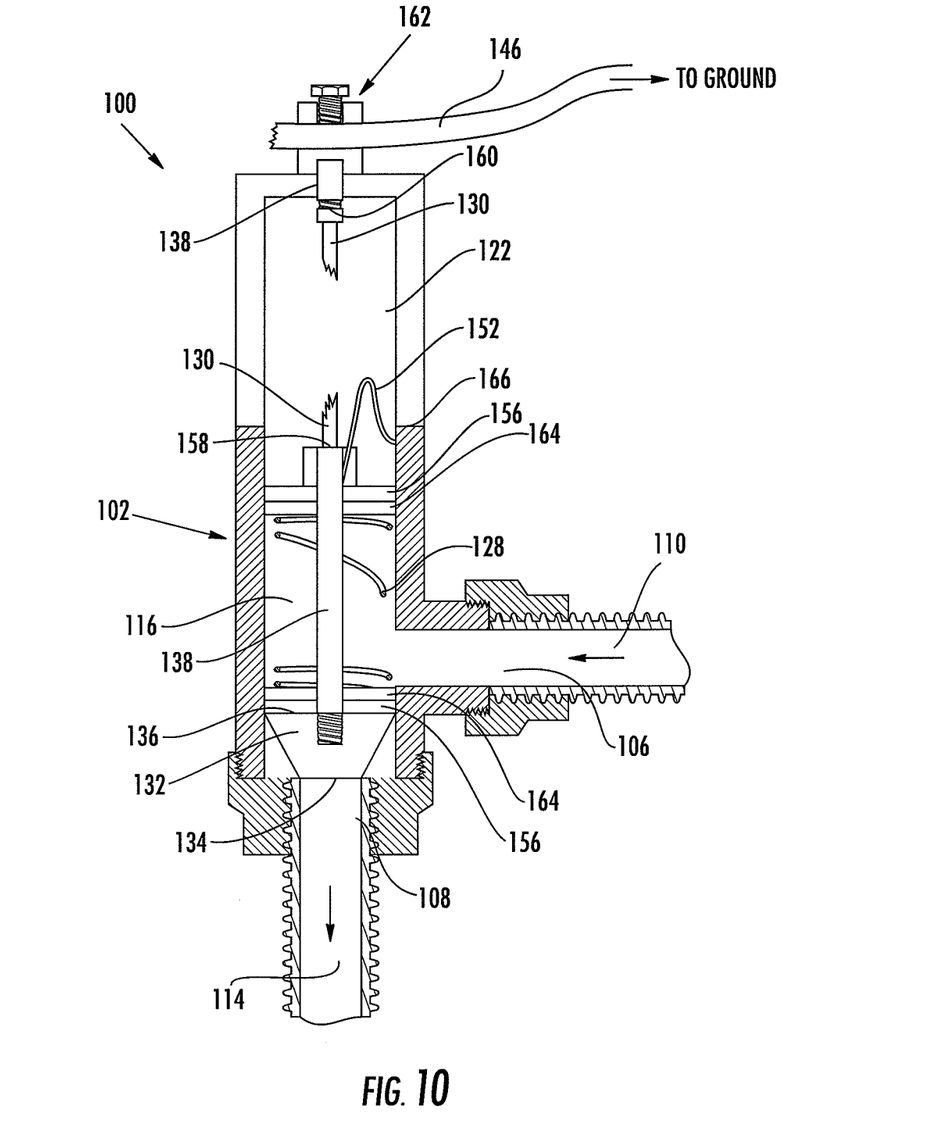
FIG. 10 is a side cross-section view depicting the safety valve shown in FIG. 1 after the valve has been triggered.

In some embodiments, the valve 100 may further comprise a wire 152 that connects the housing member 102 directly to a portion of the valve insert 104. In certain embodiments, the wire 152 may be fused to the housing member 102 and valve insert 104 or other types of connection means may be used. For example, the wire 152 may be riveted to the housing member 102 or the valve insert 104. The wire 152 is intended to conduct electricity directly from the housing member 102 to at least a portion of the valve insert 104. Accordingly, the wire 152 may be formed by an electrically conductive material, such as copper. The wire 152 should be sized with sufficient length to ensure that the valve insert 104 can travel sufficiently far to ensure that the plunger 132 is seated at the annular seat 124, as shown in FIG. 10.

The piston assembly 126 is slidably moveable between an open position, where fluid is permitted to freely flow through the valve 100, and a closed position, where the first end 134 is in contact with the annular seat 124, which seals the outlet orifice 108 to prevent fluid from flowing through the valve 100. The axial bore 122 is designed to guide the piston assembly 126 as it moves from the open position to the closed position. Therefore, the bore 122 is dimensioned to closely fit the piston assembly 126 to prevent excessive travel or play as the piston assembly 126 moves from the open position to the closed position.

Figure 6:
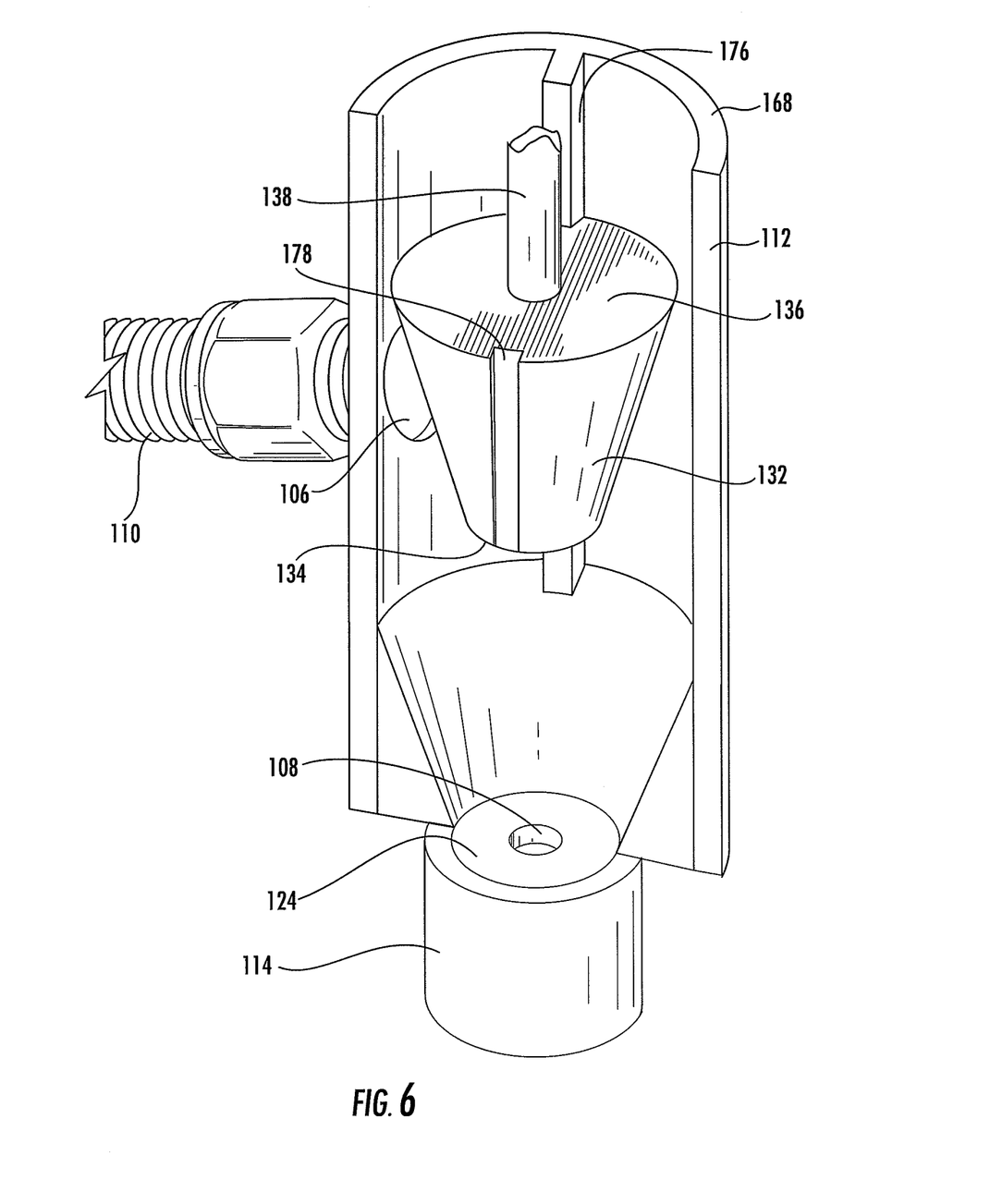
FIG. 6 is a cutaway perspective view depicting a piston assembly and housing member according to an embodiment of the present invention.

As shown in FIG. 6, in certain embodiments, the safety valve 100 may further comprise a guide assembly, which includes at least one slit 178 formed into a portion of the plunger 132 and at least one guide rod 176 formed into at least a part of the bore 122 that is dimensioned to receive the slit 178. One intended purpose of the guide assembly 144 is to assist in guiding the piston assembly 126 from the open position to the closed position, as the plunger 132 slides along the guide rod 176.

Ideally, once the piston assembly 126 has been moved to closed position, a leak proof seal is formed between the first end 134 of the plunger 132 and the annular seat 124, which should prevent fluid flow through safety valve 100. In certain embodiments, the first end 134 may further include a sealing member to assist in producing a leak proof seal with the annular seat 124. The sealing member may include, for example, a rubber gasket or membrane covering at least a portion of the first end 134, at least a portion of the annular seat 124, or both.

Referring now to FIGS. 1 and 10, the biasing member 128 may be used to move the piston assembly 126 from the open position (shown in FIG. 1) to the closed position (shown in FIG. 10). In certain embodiments, the biasing member 128 comprises a coil spring. The biasing member 128 is preferably positioned within the valve chamber 116 adjacent the second end 136 of the plunger 132. The biasing member 128 may be placed in close proximity to the stem 138. For example, if a coil spring is used as the biasing member 128, it may encircle the stem 138. Possible advantages of this configuration are that it would tend to conserve space in the safety valve 100 and may also ensure more consistent operation of the valve 100 than if the biasing member 128 was placed far from the stem 138. For example, this configuration may tend to provide consistent and evenly distributed pressure from the biasing member 128 to the plunger 132. Additionally, in certain embodiments, a first washer 156 may be positioned at either or both ends of the biasing member 128 to provide a stable surface on which the biasing member 128 may be seated.

The fusible link 130 serves the duel purpose of (1) acting as a triggering mechanism that holds the piston assembly 126 in the open position and, once triggered, releases the piston assembly 126 and allows it to be moved to the closed position; and (2) acting as a grounding mechanism for the safety valve 100. Under normal operating conditions, the valve 100 is held in the open position and fuel is allowed to flow through it. However, the valve 100 may be triggered and closed when electric current is present. In particular, if electric current is present in either the first fuel line 110 or the second fuel line 114, the valve is designed to provide a ground for that current. Ideally, the current will flow into the housing member 102, through the fusible link 130, and then through to the grounding member 146. The valve 100 may conduct at least of portion of the electrical current present in the fuel line to the ground. As further explained below, once the trigger point amperage has been reached, the fusible link 130 is designed to break. As shown in FIG. 10, once broken, the plunger 132 is released and is moved to the closed position, where flow of fuel through the valve 100 is interrupted.

Fusible links in general are engineered to fail at some predetermined triggering event before some other more substantial or costly damage is done to the system. For example, in automobiles and residential fuse boxes, a variety of fuses interrupt excessive current so that further damage by overheating or fire is prevented. In certain cases, fusible links may comprise an electrically conductive wire or other electrically conductive link that is designed to fail and separate at some known electrical current (e.g., 30 amps). The rating or the amperage at which the fusible link fails may be varied in a number of ways, including by varying the gauge of wire used or the cross-sectional area of the link.

In this case, to assist in directing electrical current through the stem 138 and not through an undesired portion of the valve 100, various portions of the valve 100 may be formed using an electrically non-conductive material, such as plastic, in order to direct the current through the desired portions of the valve 100. For example, the biasing member may be formed using a nonconductive material. Alternatively, a second washer 164, formed using an electrically non-conductive material (e.g., plastic, Teflon or rubber) may be placed positioned at the contact points between the biasing member 128 and the valve insert 104, such as at second end 136 of the plunger 132.

Figure 7:
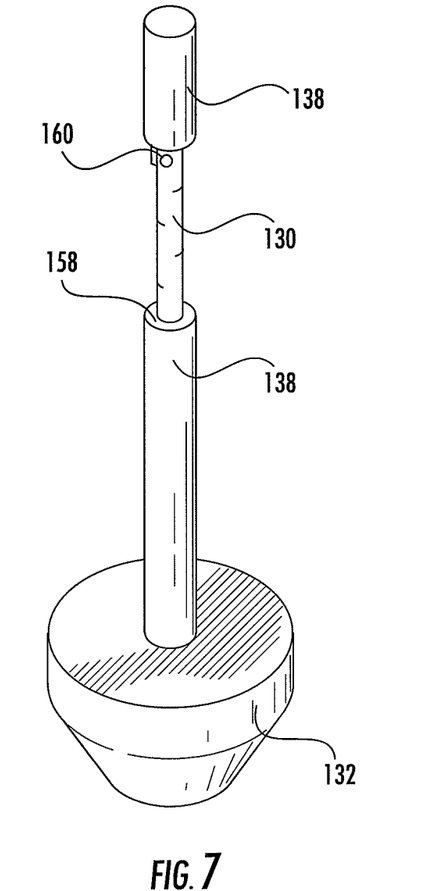
FIG. 7 is a perspective view depicting a piston assembly and a fusible link according to an embodiment of the present invention.

Referring now to FIGS. 1 and 2, the fusible link 130 is positioned within the valve chamber 116 and a lower end 158 of the fusible link 130 is connected to the stem 138. An upper end 160 of the fusible link 130 may be connected to a grounding connection 162, which is then connected to the grounding member 146 and to electrical ground. In other embodiments, as shown in FIG. 7, the upper end 160 of the fusible link 130 may be connected to another stem 138, which is then connected to the grounding connection 162. In either of the above configurations, the connections may be made using threaded or welded connections. However, the connection is preferably a threaded connection to facilitate the ready removal of the fusible link 130 from the stem 138.

With reference to FIGS. 1, 2, and 10, in operation, the fusible link 130 is held in tension due to the tension caused by the biasing member 128 (e.g., the compressed spring) and due to the weight of the stem 138 and the plunger 132. The fusible link 130 may be sized to accommodate tensile load placed on it by the biasing member 128. In other words, the fusible link 130 may be sized such that it can hold the piston assembly 126 in the open position and under a constant tensile loading until triggered. Alternatively, in certain embodiments, the biasing member 128 may be sized to accommodate the desired amperage rating of the safety valve 100. In this case, the spring may be sufficiently powerful to ensure a quick and solid closure of the valve 100 once the triggering amperage has been reached and the fusible link 130 has been broken. It should be noted that, in certain embodiments, the biasing member 128 might be eliminated entirely. In certain orientations, the operation (i.e., closure) of the safety valve 100 may rely solely on the force of gravity. In that case, once the fusible member was broken, the piston assembly 126 would move from the open position to the closed position due to the weight of the stem 138 and the plunger 132.

To ensure that the valve 100 closes quickly, thereby making it more likely to prevent fires, the fusible link 130 may be triggered in the presence of a low amount of electrical current, including electrical current due to direct or indirect lightning strikes. A direct lightning strike would consist of lightning striking the fuel line itself, whereas an indirect lightning strike occurs when lightning strikes one object and then travels to another object, such as the fuel line. For example, indirect lightning strikes often occur when lightning strikes a tree or other structure that is located near a residential fuel line. The electricity travels through the first object (e.g., the tree or power line) and then to the fuel line over the ground or along some other conductive surface. A direct lightning strike would likely produce a massive amount of electrical current in the fuel line and in the safety valve 100, because the average lightning strike carries an electric current of 30,000 amperes. However, an indirect lightning strike may be a fraction of that amount.

Therefore, the tripping point (i.e., the amperage that causes the link to break) for the fusible link 130 may be set to a fairly low threshold (e.g., 30-100 amps) to accommodate high or low current amounts, such as direct or indirect lightning strikes. In this case, a suitable fuse may include a 30-amp fuse link such as GRAINGER® fuse link #4xH93 or GRAINGER® fuse link #4XK03 or a 100-amp fuse link such as GRAINGER® fuse link #4xH96, or other similar fuses. However, in certain other embodiments, larger fuses may be appropriate or required.

Figure 8:
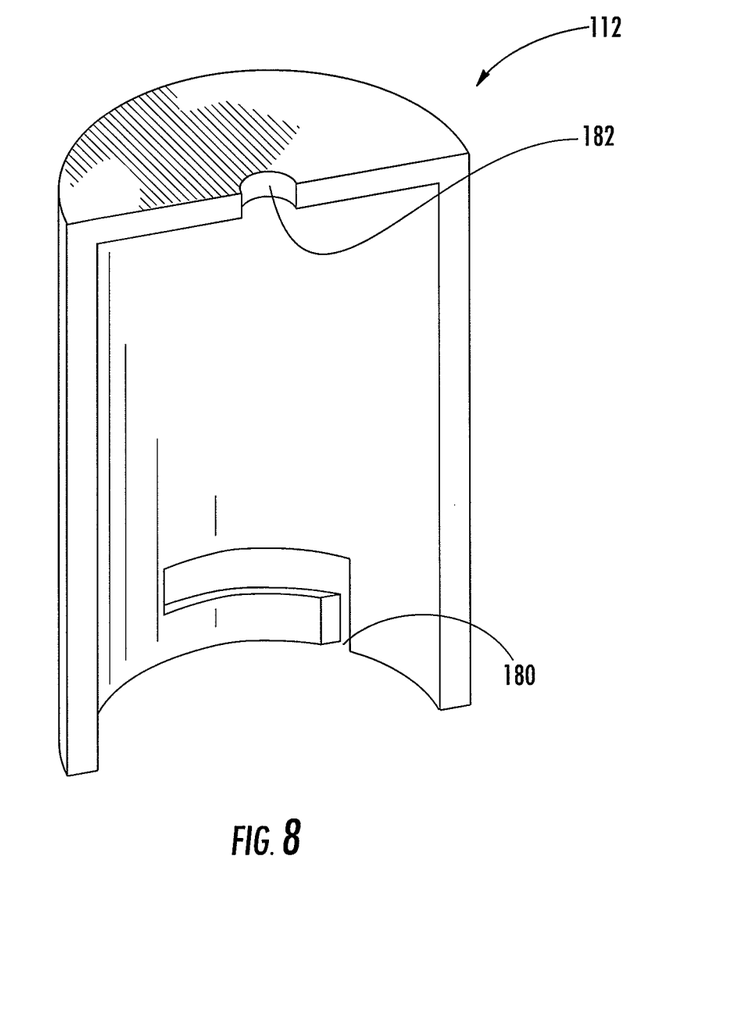
FIG. 8 is a sectional perspective view depicting a shell according to an embodiment of the present invention.

As shown in FIG. 8, a shell 112 may be fixed to the housing member 102 using a connection such as a threaded connection or a snap-on connection. In certain embodiments, the shell 112 may include a slot 180 that is dimensioned to receive a second post 170 (shown in FIG. 3) to connect the shell 112 to the housing member 102. The shell further comprises an orifice 182, through which a portion of the valve insert 104 may extend from the shell 112. In addition to interrupting the flow of fluid through the valve 100, a second purpose of the valve insert 104 is to conduct electricity to a grounding member 146. For that reason, the shell 112 may be non-conductive such that electrical current is channeled through the valve insert to the grounding member 146.

Figure 9:
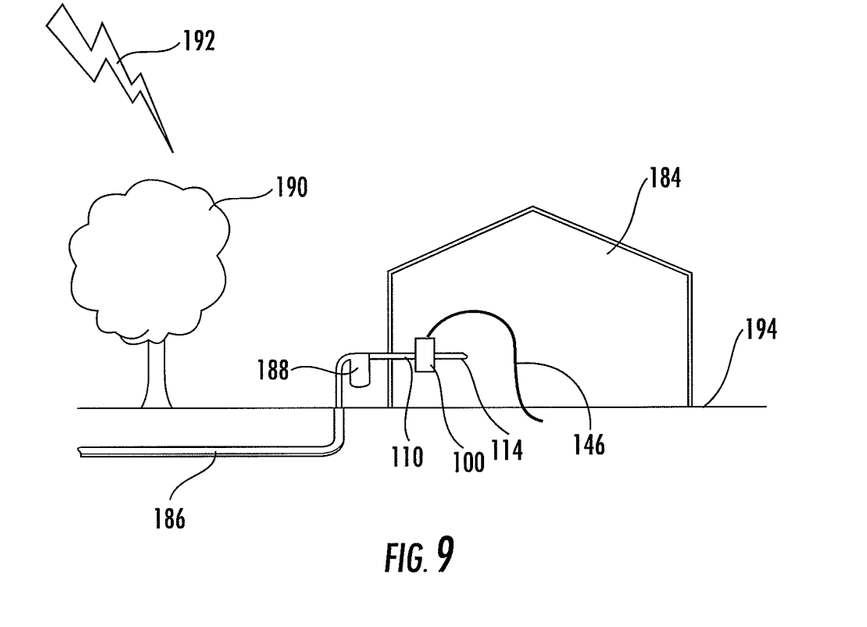
FIG. 9 is an elevation view depicting a residential structure including a safety valve according to an embodiment of the present invention.

FIG. 9 illustrates one of many ways that electric current may be introduced into a fuel line. A bolt of lightning 192 is shown striking a tree 190. Lightning may travel from the tree 190 to the fuel supply line 186 or to the ground and then to the structure 184, where it may then flow through the fuel meter 188 and into the first fuel line 110. In operation, the safety valve 100 is used in conjunction with a structure 184 that is supplied with fuel via a fuel supply line 186. Fuel is piped to the fuel meter 188 and then carried into the structure 184 via the first fuel line 110. The safety valve 100 is positioned between the first fuel line and the second fuel line 114, which is used to carry the fuel to other parts of the structure 184 such as gas appliances. The grounding member 146 of the valve 100 is connected to an electrical ground 194. If electric current is present in the fuel line 110, 114 or 186, as in the example provided above, the valve 100 is designed to interrupt the flow of fuel to prevent potential fires. The valve 100 accomplishes this by interrupting the flow of fuel from the first fuel line 110 to the second fuel line 114. For this reason, the valve 100 is ideally positioned at or near the location at which the first fuel line 110 first enters the structure 184. In this way, electrical current quickly reaches the valve 100 and the chance for fire is minimized.

Referring to FIGS. 1 and 2, continuing with the above example, after current has entered the first fuel line 110, it will flow through the electrically conductive housing member 102. At this point, fuel continues to flow through the valve 100, namely, from the first fuel line 110, through the valve chamber 116, and out through the second fuel line 114. The electric current may travel through the valve 100 to the fusible link 130 via electrically conductive portions of the valve insert 104, such as the plunger 132 and stem 138, but not through the non-conducting portions, such as the biasing member 128. Alternatively, the current may travel to the fusible link 130 via the electrically conductive wire 152. Current has a tendency to flow to ground, such as through the grounding connection 162, grounding member 146, and to the electrical ground 194. Once electric current reaches the fusible link 130, the fusible link 130 will break if the amperage surpasses the tripping point (e.g., 30 amps). Once the fusible link 130 breaks, the compressive force holding the biasing member 128 in a compressed state is relieved, and the biasing member 128 causes the piston assembly 126 to be moved from the open position to the closed position, which interrupts the flow of fuel from the first fuel line 110 to the second fuel line 114.

After it has been triggered (i.e. after the fusible link 130 has been broken), the valve 100 may be reset by replacing the fusible link 130. First, the grounding member 146 is removed from the grounding connection 162. Next, the shell 112 is removed from the housing member 102. The broken fusible link 130 is removed from the piston assembly 126 and the shell 112. A new fusible link 130 is placed into position and the valve is reassembled. In this way, the valve 100 does not require removal from the fuel line to be reset.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A safety valve for interrupting the flow of fuel through a fuel line, the safety valve comprising:
    a housing member having a fluid passage therethrough, the housing member comprising:
    an inlet orifice and an outlet orifice in fluid communication, the inlet orifice dimensioned for receiving a first fuel line and operable for permitting the flow of fuel into the housing member, the outlet orifice dimensioned for receiving a second fuel line and operable for permitting the flow of fuel out of the housing member; and
    an elongate valve chamber having a proximal end and a distal end, the distal end disposed adjacent the inlet orifice and the outlet orifice, the valve chamber further comprising an axial bore, and an annular seat disposed at the proximal end of the valve chamber; and
    a safety valve insert disposed within the axial bore of the valve chamber and operable for interrupting the flow of the fuel from the inlet orifice to the outlet orifice, the safety valve insert comprising:
    a piston assembly slidably movable between an open position and a closed position within the axial bore, the piston assembly comprising:
    a plunger, including a first end and a second end, the first end configured to be received by the annular seat in the closed position to create a seal between the first end and the annular seat to interrupt the flow of fuel from the inlet orifice to the outlet orifice;
    a stem connected to the second end of the plunger, the stem comprising an elongate shaft having a lower end and an upper end, the lower end of the stem operable for connecting to the plunger;
    a fusible link connected to the upper end of the stem, the fusible link disposed between the upper end of the stem and the distal end of the valve chamber, the fusible link operable for releasably fixing the piston assembly in the open position and for releasing the piston assembly in response to electrical current passing through the link to a grounding surface;
    a connection end formed at an end of the fusible link, the connection end extending through the housing member and operable for connecting to a grounding surface; and
    an electrical conductor connected between the housing and the insert to provide an electrical path from the housing to a second end of the fusible link.

2. The safety valve of claim 1 further comprising a biasing member disposed adjacent the second end of the plunger and operable for moving the plunger from the open position to the closed position.

3. The safety valve according to claim 2 wherein the biasing member is a coil spring.

4. The safety valve according to claim 1, wherein the electrical conductor is an electrically conductive wire connecting the housing member to the safety valve insert, the wire operable for conducting electric current from the housing member to the safety valve insert.

5. The safety valve of claim 1 further comprising a shell disposed adjacent the distal end of the valve chamber and dimensioned for encasing at least a portion of the safety valve insert.

6. The safety valve of claim 5 wherein the shell is electrically non-conductive.

7. The safety valve of claim 1 wherein the fusible link comprises a replaceable cartridge.

8. The safety valve of claim 1 wherein the safety valve insert further comprises a slit disposed in a perimeter section of the plunger and wherein the valve chamber further comprises an elongate guide rod disposed axially along the perimeter of the axial bore, wherein the guide rod and is dimensioned for being slidably moveable within the slit to operatively guide the plunger along the axial bore.

9. The safety valve of 1 wherein the valve chamber further comprises a selectively removable cap disposed within the axial bore adjacent the distal end of the valve chamber, wherein the cap includes an orifice through which at least a portion of the valve insert may extend out of the valve chamber.

10. The safety valve of claim 1 wherein the valve chamber includes a threaded connection end operable for providing a screw-on connection with a similarly threaded shell.

11. A safety valve insert operable with a safety valve, having a housing having an inlet orifice, an outlet orifice, and an axial bore and having an annular seat, for interrupting the flow of fuel through a fuel line, the safety valve insert comprising:
    a piston assembly slidably movable between an open position and a closed position within the axial bore, the piston assembly comprising:
    a plunger, including a first end and a second end, the first end configured to be received by the annular seat in the closed position to create a seal between the first end and the annular seat to interrupt the flow of fuel from the inlet orifice to the outlet orifice;

a stem connected to the second end of the plunger, the stem comprising an elongate shaft having a lower end and an upper end, the lower end of the stem operable for connecting to the plunger;

a fusible link connected to the upper end of the stem, the fusible link disposed between the upper end of the stem and the distal end of the valve chamber, the fusible link operable for releasably fixing the piston assembly in the open position and for releasing the piston in response to electrical current passing through the link to a grounding surface;

a connection end formed at a first end of the fusible link, the connection end extending through the housing member and operable for connecting to a grounding surface; and an electrical conductor connected between the housing and the insert to provide an electrical path from the housing to a second end of the fusible link.

12. The safety valve insert of claim 11 further comprising a biasing member disposed adjacent the second end of the plunger and operable for moving the piston assembly from the open position to the closed position.

13. The safety valve insert of claim 12, wherein the biasing member is a coil spring.

14. The safety valve insert of claim 12, wherein the biasing member comprises an electrically non-conductive material.

15. The safety valve insert of claim 11 further comprising a shell operable for encasing at least a portion of the safety valve insert.

16. The safety valve insert of claim 15 wherein the shell is electrically non-conductive.

17. The safety valve insert of claim 11 wherein the fusible link comprises a replaceable cartridge.

18. The safety valve insert of claim 11 wherein the safety valve insert further comprises a slit disposed in a perimeter section of the plunger and wherein the valve chamber further comprises an elongate guide rod disposed axially along the perimeter of the axial bore, wherein the guide rod and is dimensioned for being slidably moveable within the slit to operatively guide the plunger along the axial bore.

19. The safety valve insert of claim 18 further comprising a second slit and a second guide rod.

20. A safety valve for interrupting the flow of fuel through a fuel line, the safety valve comprising:

an electrically conductive housing member disposed in a fuel line, the housing member provided with a fluid passage therethrough;

valve means for interrupting fluid passage through the housing member;

triggering means for releasably fixing the valve means in an open position whereby fluid passage through the housing member is permitted and for triggering the movement of the valve means to a closed position where fluid passage is interrupted in response to the presence of electrical current;

grounding means for carrying electrical current from the triggering means to an electrical ground; and an electrical conductor connected between the housing and the valve means to provide an electrical path from the housing to the grounding means.

* * * * *